United States Patent [19]

Ewe et al.

[11] 3,986,892

[45] Oct. 19, 1976

[54] POROUS COBALT ELECTRODES FOR ALKALINE ACCUMULATORS AND HYBRID CELL THEREWITH AND AIR ELECTRODE

[76] Inventors: Henning H. Ewe; Eduard W. Justi, both of 1B Mendelssohnstrasse, D-33 Braunschweig, Germany

[22] Filed: Dec. 10, 1973

[21] Appl. No.: 423,482

[30] Foreign Application Priority Data

Dec. 15, 1972 Germany............................ 2261378

[52] U.S. Cl............................... 429/218; 429/241; 29/182.2; 75/.5 B
[51] Int. Cl.².................... H01M 4/24; H01M 4/52; H01M 10/30; H01M 12/06
[58] Field of Search....................... 136/24, 86 A, 3; 252/477 Q, 477 R

[56] References Cited
UNITED STATES PATENTS

| 882,144 | 3/1908 | Edison | 136/24 UX |
|---|---|---|---|
| 2,646,455 | 7/1953 | Jeannin | 136/24 |
| 2,860,175 | 11/1958 | Justi | 136/86 D X |
| 2,969,413 | 1/1961 | Peters | 136/24 |
| 3,230,113 | 1/1966 | Herold | 136/24 X |
| 3,288,641 | 11/1966 | Rightmire | 136/24 X |
| 3,311,505 | 3/1967 | Paget | 136/24 X |
| 3,341,446 | 9/1967 | Vielstich et al. | 252/477 R |
| 3,418,171 | 12/1968 | Popat | 136/24 X |
| 3,479,226 | 11/1969 | Oswin | 136/86 A |
| 3,532,548 | 10/1970 | Stachurski | 136/86 A |

FOREIGN PATENTS OR APPLICATIONS

| 2,018,635 | 11/1971 | Germany | 136/24 |
|---|---|---|---|
| 1,803,121 | 3/1970 | Germany | 136/24 |

*Primary Examiner*—Allen B. Curtis
*Attorney, Agent, or Firm*—Erich M. H. Radde

[57] ABSTRACT

A porous, preferably negative, electrode for alkaline accumulators, characterized by the fact that its electro-chemically active inner surface amounts to between 1 and 20 sp.m. per gram for a volume porosity of between 30 and 85% and that its pore interval ranges between 0.15 and 1.0 $\mu$m.

11 Claims, 2 Drawing Figures

POROUS COBALT ELECTRODES FOR ALKALINE ACCUMULATORS AND HYBRID CELL THEREWITH AND AIR ELECTRODE

BACKGROUND OF THE INVENTION

The present invention relates to porous electrodes for alkaline accumulators which because of their novel structure provide both higher specific capacities and also greater current densities of charging and discharging, in line with the present need for avoiding exhaust gases and noise by changing over to accumulator cars. Even though in principle the invention relates to all kinds of accumulator electrodes, it is nevertheless specially suitable for negatives consisting of porous cobalt in combination with the standard positives on a nickel hydroxide basis or with air-breathing oxygen cathodes in hybrid batteries.

The significance of the porosity for the specific capacity of accumulator electrodes was asserted by various inventors decades ago, but was so inaccurately defined that this parameter could not be distinctly measured nor utilised for the systematic improvement of electrodes. Thus, for example, Thorausch and Schlecht in 1929 in German Pat. 583 869 and Ackermann in 1929 in German Patent 806 122 described processes with which they introduced nickel or iron powder obtained from carbonyl compounds as materials for electrode technology, such as are still usual in industry today. They showed that these powders could be mixed with fillers which could be removed subsequently, they could be sintered without pressure to form porous plates and they gave a number of examples of processes for this purpose. According to Example 1 of Thorausch and Schlecht an electrode sintered from carbonyl iron would have a pore volume of 84% and correlated with this a specific capacity 20% higher than the previously used Edison negatives with a tubular structure. The porous nickel plates sintered in a similar manner by Ackermann were said to possess a pore volume of 76.9%. In none of these basic patents are the size and shape of the pores mentioned.

How little relevant this undefined concept of volume porosity is can be seen clearly from the statement of the inventors that very different numerical values can be found regarding such sintered articles according to the method of measurement employed. The total pore volume can naturally be determined if one (1) weighs the porous electrode and a pore-free article of the same external dimensions and calculates the difference in weight. If as an alternative (2) one uses the so-called BET method of measurement of Brunauer, Emmett and Teller, according to which the porous article is first of all weighed in high vacuum and then in a chemically inert gas atmosphere and the difference in weight resulting from the gas adsorption on the inner surfaces is assessed, the gas cannot penetrate into the closed and so-called "dead" pores, and instead one only determines the internal surface of the open and so-called "transient" pores. But if one 3) investigates the porous article in the mercury porosimeter, the mercury can only penetrate into the wider pores and not into the narrower ones, so that one only determines a part of the transient pores and one obtains a still lower numerical value for the volume porosity than according to 1) and 2).

The observation that the dead porosity can make no contribution to the specific capacity was, it is true, obviously unknown to the earlier inventors mentioned, but apears to be plausible because the electrolyte which on the one hand must supply the OH⁻ ions for the building up of the metallic hydroxide layer during the discharge of the negative electrode and on the other hand must take it up again during charging has no access to the dead pores.

DESCRIPTION OF THE INVENTION

Figure 1:
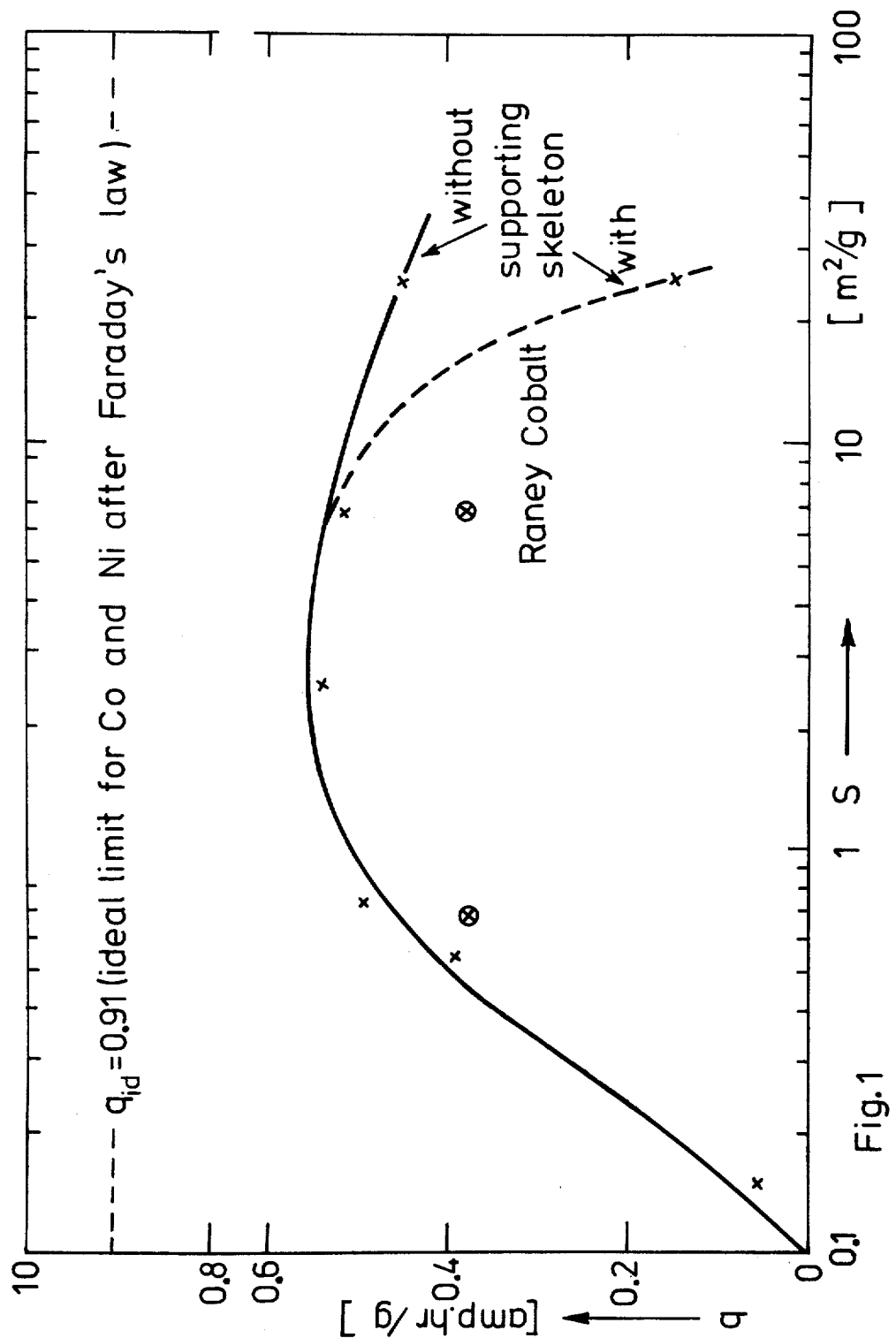
FIG. 1 is a graphical plot of electrode capacity (q) versus the specific surface area (s) of the electrode calculated according to the BET method for an electrode in accordance with the invention; an FIG. 2 is a schematic longitudinal cross-sectional view through a hybrid battery in accordance with the invention.

On the other hand, the discovery made by the inventors to the effect that also by no means all the open pores make an appreciable contribution to the capacity is completely surprising. They have in fact found that on nickel it is possible for at most 60 molecular layers to grow, corresponding to 0.02 $\mu$, and on cobalt at most about 500 $Co(OH)_2$ layers corresponding to a thickness of 0.33 $\mu$. Consequently in porous electrodes all the pores which are narrower than 2 layer thicknesses are blocked up during the discharge and cannot be reduced again by electrolyte during the subsequent charging because of the lack of access. In practice this means that in nickel negatives all pores below about 0.05 $\mu$ and in cobalt negatives all pores below about 0.66$\mu$ may be counted out with regard to the storage of a charge. Conversely, if a pore is very much wider than double the thickness of the maximum hydroxide layer, its cross-section is only filled to the extent of a small fraction by the chargestoring metallic hydroxide layer and the pore therefore uselessly takes up too large a proportion of the volume of the electrode. Therefore the present invention avoids so far as possible both pores which are narrower than double the thickness of the hydroxide layer and also those which are more than about three times wider, (i.e., the pores should be between two times and about three times the maximum thickness of the metal hydroxide layer), in the case of nickel therefore 0.06$\mu$ and the case of cobalt about 1$\mu$. A suitable cobalt electrode according to the invention has a pore interval of 0.15 to 1 $\mu$. This knowledge leads to the further teaching that it is not the pore width which primarily determines the magnitude of the specific capacity which can be reached, but that these only secondarily have an adverse effect by taking up too great a volume and restricting the electrolyte flow. The present invention is therefore based on the fact that the parameter which is of primary importance is instead the specific internal surface area such as occurs in the transient pores of suitable width just mentioned. The thickness of this hydroxide layer, multiplied by the inner area in sq. m. per gram covered by it and therefore electrochemically active gives the volume of the storage mass and when this is multiplied by the Faraday constant it gives the specific capacity in $Ah/cm^3$ or when multiplied by the density 4.1 $g/cm^3$ gives the capacity in Ah/g.

A further problem underlying this invention is therefore the enlargement of the internal surface area S by building up the electrode from granules of a particularly suitable geometrical shape. At the time of the older patents cited above with regard to sintered electrodes there was no information regarding the shape of sufficiently fine metal granules because the traditional optical microscope could not resolve sufficiently details beyond about 1 $\mu$m; later on it is true that the electron microscope made it possible to improve the order of magnitude of the resolution, but only in transparency, so that one could only see the shadows of individual metallic granules. It is only the most recently discovered electron scan microscope which makes possible a direct view of porous metallic granules with the requisite degree of resolution and depth of focus. It was O. Johari and S. Bhattacharyya in 1969 who first published as complete a view as possible regarding the different grain forms as a function of the production process using micrographs of this kind, and according to this most of the known metallurgical processes for the production of metal powders, such as the carbonyl process, the atomisation of metals in water, gas or vacuum supply spheres of greater or lesser perfection ("equiradial") and according to the determinations of the inventors this also applies to the powders much used in industry and obtained by the known Sherritt Gordon Process of the reduction of metallic salts dissolved in water in the autoclave at about 150° C and about 100 atmospheres of hydrogen. All these approximately spherical grain forms which were introduced into industry as carbonyl metals under the influence of the patents of Thorausch and Schlecht or Ackermann and have hitherto dominated the field have been expressly rejected by the present invention because according to geometrical formulae the sphere possesses the smallest surface S for a given volume V. In point of fact spherical carbonyl metal powders with the smallest grain obtainable commercially of about 3 $\mu$m radius reach an internal surface area of at most 0.5 sq.m. per gram, which with the hydroxide layer thickness stated of 0.17 $\mu$m can reach a specific capacity $q = 0.18$ Ah/g. In this way it has become possible to explain quantitatively the small values of $q$ achieved hitherto and the next practical problem consists in using the new teachings where possible to discover metal powder granules with a considerably greater S/V ratio, which clearly must be realised to be far from the spherical form. But also the non-equiradial metallic granules illustrated in the investigation mentioned above and which are produced from metal sponge or reduced or electrically produced from scale and are evidently irregular in shape, according to the BET measurements of the inventors still do not attain a specific surface area of a higher order of magnitude. However, the inventors by their own systematic electron microscope and BET investigations have found that the method of reduction of highly dispersed low-alkali oxides in a hydrogen stream between 500° and 700°, not mentioned in the report of Johari and Bhattacharyya, under special conditions provides extremely irregularly shaped and fissured particles which possess BET surface areas of about 1 to 10 sq.m. per gram and provide $q$ values of up to about 0.6 Ah/g.

In point of fact, if one alloys Co with Al by the Raney method and dissolves the latter in alkali, one can obtain a cobalt powder with an even greater BET surface area such as 20 sq.m. per gram and over, but this means, when processed to form porous electrodes, somewhat lower $q$ values, which must be regarded as unexpected in the light of the teachings of the earlier inventors cited above. This decrease in the specific capacity with further increasing values of S, however, is quite comprehensible in the light of the teachings of this invention set out above because, if one inserts too great an internal surface area in a given volume, the pore radius will fall below the optimum. These facts can also be expressed by saying that the electrodes according to the invention are equipped with internal surface areas of 1 to 10 sq.m. per gram in structures of 30 to 85% utilisable porosity. The value of $q$ of 0.45 Ah/g achieved with Raney cobalt is in fact still reduced to one-half to one-third if one mixes the Raney powder which has a tendency to trickle with 1 to 2 parts of an inactive metal powder such as Ni or Cu and presses it so as in this way to incorporate a supporting framework which guarantees the mechanical strength and electrical conductivity. The results are set out in FIG. 1, where the BET surface areas of various commercial Co powders are plotted on the logarithmically calibrated abscissa, whilst on the ordinate there are plotted the values of $q$ of electrodes produced from them by various processes. The theoretical expectations are confirmed by the course followed by the curves, in that the capacities show a pronounced maximum in the S range of a few square meters per gram, after smaller values of S fall distinctly linearly and towards greater values of S above a few 10 m²/g become small once again; here the solid curve relates exclusively to the active Raney cobalt powder, whilst the dotted curve includes the supporting structure.

The transition from spherical granules to granules with a large surface area, however, not only increases the capacity but also as a result of increasing the contact surfaces of the granules the mechanical strength and the specific conductivity of the electrodes are increased. The latter has the result that the charging and discharging characteristic becomes harder and one can go over to automatic charging with voltage-controlled rectifiers and for this purpose one does not need qualified staff. Further consequences of this reduction of non-linear parts of the characteristic are an improved constancy of the discharge voltage, such as is required by modern electronic components, such as transistors, and an increase in the so-called ampere hour efficiency of the storage, which reaches 88 to 91%. Also the watt hour efficiency is improved, because the charging voltage on an average is only about 70 mV over the discharge voltage. For the same reason the capacity only falls slightly if one discharges the electrodes according to the invention more rapidly than with the nominal current density.

The simple geometrical considerations dealt with so far do not include the physico-chemical properties of the electrode materials nor any special production processes. It is merely pre-supposed that the granules retain to some extent their original shape, that is to say they are not too easily deformable like Cd; but the considerations also relate to iron and nickel powders just as well as to cobalt, as is confirmed by the experiments. Also because of this geometrical nature of the hypotheses, according to the invention one obtains results with a more or less high degree of success independently of the process of the construction of the electrodes from such granules, such as for example by the classic sintering without pressure, possibly after cold pre-pressing, by simultaneous hot pressing or by filling the metal granules shaped according to the invention into known electrodes with tubes, boxes or the like; in this case it is a particular advantage that with Co, unlike Fe or Ni, the feared oxides or hydroxides with very poor electrical hardly occur. Consequently, according to the invention one can fill in the Co granules with a large surface area without adding any conductivity substance. In the following examples 1 and 2 suitable instances are given, each one for the production processes mentioned, which proves the far-reaching independence of the arrangement according to the invention.

EXAMPLE 1

Boxes or tubes made of nickel-plated sheet steel about 0.1 mm thin, such as were used previously for holding the nickel hydroxide compound and the conductivity material in positive accumulator electrodes, are instead filled without the addition of conductivity substance with cobalt powder of 6.9 sq.m. per gram so that one obtains a volume porosity of between 30 and 85%. The cobalt electrode so obtained is combined as the negative in an alkaline accumulator with any nickel hydroxide positive or an air-breathing cathode in 6N potassium hydroxide as electrolyte. With C/3 discharge the electrode gives a capacity of 0.55 Ah/g reckoned on the cobalt mass, or 0.15 Ah/g reckoned on the total weight of this negative electrode.

EXAMPLE 2

5 g of cobalt powder with an internal surface area of 2.5 sq.m./g are briefly pre-pressed in a hollow cylindrical matrix with an internal diameter of 40 mm with a pressure of 0.10 to 0.05 tons/sq.cm. at room temperature and the resultant tablet is sintered at 860° C for about 1 hour in a stream of hydrogen. One obtains an electrode with sufficient mechanical strength and a porosity of 79% which when subjected to subsequent C/5 discharge in the alkaline electrolyte against any nickel hydroxide positive gives a specific capacity of 0.38 Ah/g. If required it is possible inside the cobalt powder to insert an inactive nickel mesh or sieve and press it with it, to which the current lead can be welded after the electrode has been completed.

The negative porous electrode described according to the invention naturally requires a suitable positive for use in an alkaline accumulator. Long-term tests by the inventors have shown that it is true that by the teachings described here it is also possible to develop positives, but that also a combination with conventional nickel hydroxide electrodes of all constructions is possible without having any trouble from unfavourable mutual interactions, say by the migration of Co on to the hydroxide electrode, or vice versa. However, the known nickel hydroxide electrodes for the same capacity are about twice as heavy as the cobalt or cadmium negatives, because during the electrochemical oxidation of the negatives during the discharge 2 elementary charges are reacted, whereas in the positive only one elementary charge.

This fact means that the specific capacity of the complete accumulator, even if the case, electrolyte, terminals etc. are of such dimensions as to be as light as possible, is at most about one-third lighter than a commercial Ni-Cd accumulator, although the negative according to the invention is about 5 times lighter than one made of cadmium. The inventors have therefore in a variant considerably reduced the total weight of the battery with an accumulator electrode made of cobalt by storing the oxygen necessary for discharging the cobalt negative not also in a (positive) electrode such as one made of $Ni(OH)_2$, but continuously taking it from the surrounding atmosphere by an air-breathing porous cathode as known from fuel cell technology.

Figure 2:
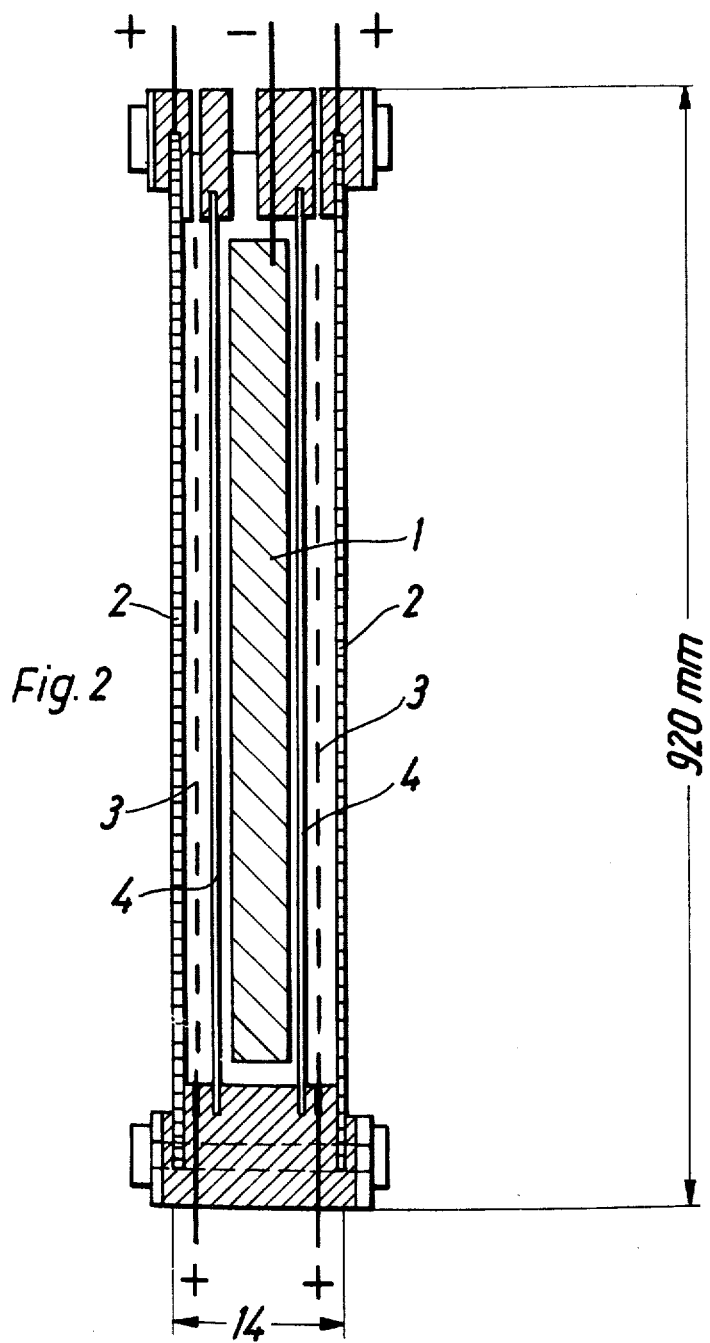

FIG. 2 is a schematic section through such a hybrid battery which has proved itself in long-term tests. The cobalt storage electrode 1 is encased in a thin porous plastic foil 4 as separator and weighs 35 g when it is 3.5 mm thick; on the left and at right it is surrounded by one of the abovementioned air-breathing cathodes (2) with silver catalyst having a Teflon binder, which together weigh 18 g. If these cathodes 2 were not only used during discharge but also during charging, they would very soon be destroyed because of the solubility of the resultant silver oxides. Therefore a pair of additional charging anodes 3 has been provided, which consist of a fine-mesh nickel gauze and the current feed of which can be seen at the bottom end of the drawing, whilst the two discharge cathode terminals 2 are made at the top. The gauzes weigh 6 g, the separators 4 5 g, the fixtures, packings and tank 60 g, the electrolyte of 6 N potassium hydroxide 30 g. The energy content of the battery is 10.3 Wh; when divided by the total weight of 154 g, one gets an energy density of 67 Wh/kg., that is to say more than twice as much as in the lightest lead acid traction battery available at the present time.

PUBLICATIONS REFERRED TO

U. Erdmann, H. Ewe and E. Justi, Energy Conversion, Vol. 13, 1973 (to appear shortly)

O. Johari and S. Bhattacharyya, Powder Technology, Vol. 2, pp. 335–348, 1968/9

E. Justi, A. Kalberlah and H. Schilling, German Published Patent Application 1 803 121; Oct. 15, 1968

E. Thorausch and L. Schlecht, German Patent 608 122; Feb. 23, 1929;

E. Thorausch and L. Schlect, U.S. Pat. No. 1,988,861; above German priority;

Y. Okinaka and D. R. Turner, Electrochemical Technology, Vol. 5, 67–72, 1967

K. Brill "Construction and properties of hydrophobic air-breathing cathodes for cells with alkaline electrolytes, " Third International Conference for the study of fuel cell batteries, Brussels 1969, pp. 39–40.

We claim:

1. A porous negative cobalt electrode for alkaline accumulators, characterized by the fact that its electrochemically active inner surface amounts to between 1 and 20 sq.m. per gram with a volume porosity of between 30 and 85% and that its pore interval ranges between 0.15 and 1.0 $\mu$m.

2. The porous negative electrode in accordance with claim 1, wherein said pore interval ranges from between two times and about three times the maximum thickness of the cobalt hydroxide layer produced during discharge of the electrode.

3. The porous negative electrode in accordance with claim 2, wherein said maximum thickness comprises about 500 molecular layers of cobalt hydroxide.

4. A porous negative cobalt electrode for alkaline accumulators, characterized by the fact that its electrochemically active inner surface amounts to between 1 and 20 sq.m. per gram with a volume porosity of between 30 and 85%, that its pore interval ranges between 0.15 and 1.0 $\mu$m and that it is built up of cobalt granules which have been obtained by the reduction of highly dispersed low-alkali cobalt oxides in a stream of hydrogen at between 500° and 700° C.

5. The porous negative electrode in accordance with claim 4, characterised by the fact that the cobalt powder according to the invention is contained without the addition of conducting substance in perforated tubes or boxes made of nickel plated sheet steel.

6. The porous negative electrode in accordance with claim 4, characterised by the fact that it comprises cobalt powder which is compacted without frame or stays.

7. The porous negative electrode in accordance with claim 6, characterised by the fact that it contains in its interior a nickel gauze or mesh which is connected with a current discharge.

8. Alkaline accumulator comprising one or more negative electrodes in accordance with claim 4 and one or more positive electrodes of the nickel hydroxide type combined with said negative electrodes.

9. Alkaline hybrid battery comprising as negative accumulator electrode, an electrode according to claim 4 a separator of thin porous plastic foil encasing said negative electrode, as positive discharge electrode, two air-breathing cathodes and as positive charging electrodes, two nickel gauzes, said gauzes being arranged between the negative storage electrode and the positive discharge electrode.

10. The porous negative electrode in accordance with claim 4, wherein said electro-chemically active inner surface area is between about 1 and 10 m$^2$/g.

11. A method for fabricating the porous negative electrode of claim 1, comprising the steps of reducing a highly-dispersed low-alkali cobalt oxide in a stream of hydrogen at a temperature between 500° and 700° C., whereby cobalt is produced and shaping said cobalt into a configuration suitable for said electrode.

* * * * *